(12) United States Patent
Baltisberger et al.

(10) Patent No.: US 8,309,867 B2
(45) Date of Patent: Nov. 13, 2012

(54) FORCE-MEASURING DEVICE USING ELECTROMAGNETIC FORCE COMPENSATION WITH CONSTANT POWER DISSIPATION

(75) Inventors: Stephan Baltisberger, Gossau (CH); Thomas Köppel, Oetwil am See (CH)

(73) Assignee: Mettler-Toledo AG, Greifensee (CH)

( * ) Notice: Subject to any disclaimer, the term of this patent is extended or adjusted under 35 U.S.C. 154(b) by 332 days.

(21) Appl. No.: 12/782,390

(22) Filed: May 18, 2010

(65) Prior Publication Data
US 2010/0294573 A1    Nov. 25, 2010

(30) Foreign Application Priority Data
May 20, 2009    (EP) .................................... 09160710

(51) Int. Cl.
*G01G 7/00*    (2006.01)
*G01G 7/04*    (2006.01)
(52) U.S. Cl. ................................. 177/212; 177/210 EM
(58) Field of Classification Search ........... 177/201 EM, 177/212
See application file for complete search history.

(56) References Cited

U.S. PATENT DOCUMENTS

| 4,134,468 | A |   | 1/1979 | Luchinger et al. |
|-----------|---|---|--------|-----------------|
| 4,159,747 | A | * | 7/1979 | Realini ................... 177/210 EM |
| 4,245,711 | A |   | 1/1981 | Kunz |
| 4,372,406 | A |   | 2/1983 | Komoto et al. |

FOREIGN PATENT DOCUMENTS

| CH | 678455 A5 | 9/1991 |
|----|-----------|--------|
| DE | 3136171 A1 | 5/1982 |

* cited by examiner

*Primary Examiner* — Randy W Gibson
(74) *Attorney, Agent, or Firm* — Standley Law Group LLP

(57) ABSTRACT

A force-measuring device 1, particularly a balance, operates on the principle of electromagnetic force-compensation. An electric coil 53 is arranged to be movable in a magnet system 50. The coil has at least two windings W1, W2 and a current supply device PB having at least two partial current sources PB1, PB2, the current sources each assigned to a corresponding winding. A device CU controls and/or regulates the current supplied to the windings by the partial current sources in such a way that, dependent on a force L acting on the force-measuring device, a current I1, I2 is sent through each of the windings. The sum of the at least two electromagnetic forces which are thereby generated forms the compensation force, while, at the same time, the power dissipated by the coil always takes on a given predetermined value Ptg.

21 Claims, 6 Drawing Sheets

FORCE-MEASURING DEVICE USING ELECTROMAGNETIC FORCE COMPENSATION WITH CONSTANT POWER DISSIPATION

CROSS-REFERENCE TO RELATED APPLICATIONS

This application is entitled to benefit of a right of priority under 35 USC §119 from European patent application 09 16 0710.1, which was filed on 20 May 2009. The content of the European application is incorporated by reference as if fully recited herein.

TECHNICAL FIELD

The embodiments disclosed herein relate to a force-measuring device, in particular a balance, which relies on the principle of electromagnetic force-compensation.

BACKGROUND OF THE ART

Under the electromagnetic force compensation measurement principle, an opposing force, also referred to as compensation force, is generated which counteracts the force that is to be measured by the force-measuring device. As a result of this compensation, the movable parts of the force-measuring device which serve to receive and transfer the force are regulated to maintain a set position. Accordingly, in the case of a balance the weight of the weighing object represents the force to be measured, and the movable parts include components such as the balance pan, levers, rods, or the weighing cell.

In many cases, the compensation force is generated by an electromagnetic coil which is arranged so that it can move within an air gap of a magnet system and which carries an electric current that is sent through it. This current, referred to as compensation current, represents a measure for the compensation force that is being generated and thus represents a measure for the force that is acting on the force-measuring device. By measuring this compensation current, a corresponding measuring signal is obtained which is analyzed in a signal-processing unit and converted into results that are delivered to an indicator device.

Force-measuring devices based on electro-magnetic force compensation have the disadvantage that the power which is generated in the coil by the compensation current depends on the magnitude of the current flowing and thus on the amount of force acting at any given time. Therefore, with measurements of different forces or loads following each other, different levels of power are generated and released in the form of heat.

As a consequence of the varying amounts of heat being released and the temperature changes that occur as a result, the zero point and the span of the measurement range can become unstable. These influence factors should therefore as much as possible be kept constant, particularly in force-measuring devices which have to meet exacting requirements regarding the invariability of their measurement accuracy.

The known state of the art offers different methods of achieving a power dissipation of the coil that is constant and independent of the weighing load. It is possible to use for example an additional power-consuming device which converts additional electrical energy into heat. As a result, the total amount of power consisting of the sum of the coil power and the additionally dissipated power of the power-consuming device remains largely constant. In this arrangement, the additional power-consuming device should as much as possible be neutral in its behavior in regard to force effects, so as not to influence the compensation force being generated.

For example, in DE 28 19 451 a variety of force-neutral power-consuming devices are disclosed in the form of a power transistor, a semiconductor resistor, or a coil with bifilar windings where the two coil parts are controlled so that their currents are anti-parallel, i.e. of equal magnitude but opposite direction. In a coil with bifilar windings and equal anti-parallel current flows, two forces are produced which mutually neutralize each other, so that the result is a power-consuming device which is force-neutral in its overall effect. Depending on its implementation, this concept has the following drawbacks:

The location where the non-productive power is generated is not geometrically identical with the location where the productive power is generated. Consequently, the temperature distribution in the force-measuring device still depends on the compensation force that is to be measured.

The non-productive power is released in a coil part with anti-parallel current flows that is located within the compensation coil. With this arrangement, the degree of efficiency of the force-measuring device is reduced because only part of the coil is usable for the generation of the force even at the maximum level of compensation force.

As a further way of implementing a force-neutral power-consuming device, the concept of adding an alternating current to the compensation current is disclosed in DE 31 36 171. Thus, the resultant average compensation force of the coil remains essentially unchanged, while an additional power consumption is achieved through the AC component of the current. By alternating the direction of the current, the differences in the two windings are averaged out. This form of heat generation has the disadvantage that extensive measures have to be taken to prevent the AC component from causing a change of the average compensation current.

This disadvantage can be circumvented by using a coil with two separate windings acting in opposite directions which are energized alternatingly. In this arrangement a current flowing through the first winding generates a first force, and a current flowing through the second winding generates a second force. As an average, the two forces will produce a resultant force which represents the effectively acting compensation force.

For the control of the two currents, a switch-over device is disclosed in CH 634 654 which serves to direct the compensation current through the first winding during a first time interval and through the second winding during a subsequent second time interval. This has the result that the total compensation current over the two time intervals remains to a large extent constant. However, the periodic switching of the current flows generates strong alternating forces in the coil and thus causes a considerable amount of audible noise.

If an effort is made to mitigate the negative effects of the abrupt periodic alternations of the current by means of filter elements or smoothing capacitors, the power dissipation in the coil will again strongly depend on the compensation force generated at any particular moment and thus on the weighing load that is present at any given time.

It is therefore an object to propose a force-measuring device which is based on the principle of electromagnetic force compensation and which is distinguished by the fact that a simple, cost-effective design and operation of the force-measuring device can be achieved while the force-measuring device at the same time meets stringent requirements in regard to its measurement accuracy and efficiency.

A further object is to propose a force-measuring device which meets the aforementioned requirements and which can be operated without making an irritating noise.

A further aim is to achieve an optimal utilization of the space available for the windings. This is the space which is allocated to the part of the coil system that carries the windings. It is in essence delimited by the dimensions of the permanent magnet, in particular the magnet gap in which the coil system is arranged.

SUMMARY

These tasks are solved with a force-measuring device and with a method possessing the features that are presented in the independent claims. Advantageous embodiments are described in the further, dependent claims.

The disclosed embodiments concern a force-measuring device, in particular a balance, which is based on the principle of electromagnetic force-compensation, with a movable electric coil which is arranged in a magnet system and has at least two windings, further with a current supply device which has at least two partial current sources, wherein each of said windings has one of said partial current sources assigned to it, further with a controlling device and/or regulating device which controls and/or regulates the supply of current to the windings by means of the partial current sources in such a way that, dependent on the force acting on the force-measuring device, a current is sent through each of the windings in such a way that the sum of the at least two electromagnetic forces which are thereby generated forms the compensation force and that at the same time the power dissipated by the coil always takes on a given predetermined value. By supplying the windings with current individually and simultaneously in this manner, the rate of heat generation in the coil can be controlled in a simple and efficient way without periodic alternation of the direction of current flow. Furthermore, with a current supply essentially in the form of direct current, the problem of audible noise does not exist.

The given predetermined value of the power needs to be larger than the power required at each moment to produce the compensation force, or else the required compensation force cannot be generated. Except for this limitation, the given predetermined value of the power can in principle be freely selected. For example, this value can be specified dependent on the load that is acting on the force-measuring device, so as to achieve an optimal temperature distribution. However, the given predetermined value of the power can also be defined in accordance with special predetermined conditions, as is described in the examples of embodiments.

The disclosed embodiments further concern a suitable device for controlling a force-measuring device, in particular a balance, which is based on the principle of electromagnetic force-compensation, with a movable electric coil which is arranged in a magnet system and has at least two windings, and using the following method in order to supply said windings with current: dependent on the force acting on the force-measuring device, a current is sent through each of the windings in such a way that the electromagnetic forces which are thereby generated form in their overall outward effect the compensation force. In this arrangement, the at least two currents are sent through the windings and the respective strengths of the currents are controlled and/or regulated by taking into account the total power generated in the coil, in such a way that the magnitude of said power remains constant, independent of the resultant compensation force.

Due to the coil having more than one part, an additional degree of freedom is gained for managing the current, which offers the possibility to control the overall power dissipated in the coil, independent of the required compensation force. In other words, it becomes possible to control and/or regulate the force generation and the power in the coil independently of each other in such a way that they are not mutually influencing each other.

This concept has the important advantage that it allows higher overall levels of power to be achieved. Consequently, the measurement range can be significantly increased while keeping the same lever ratio. For example, a measurement range of 0 to 400 grams can be expanded to a measurement range of 0 grams to 1 kilogram. Alternatively, or in addition, it is also possible to use a smaller lever ratio.

The embodiment proves especially advantageous if the wires of the individual windings have been wound together (i.e., in the case of two wires, in the form of a bifilar winding). With this kind of winding arrangement, the temperature generated by the power dissipation in the components of the force-measuring device and the local distribution of said temperature are kept optimally constant, whereby a high level of measurement accuracy and stability of the force-measuring device are achieved.

In an advantageous embodiment, the given predetermined value is constant. Under this concept, the given predetermined value can either be constant over the entire load range of the force-measuring device, or it could also be constant only over a part of the load range. It is conceivable, for example, that within a range from zero load to 80% of capacity the given predetermined value is prescribed as being constant and within the range from 80% to 100% of capacity the given predetermined value is prescribed according to whatever power is required at the moment in order to generate the compensation force. As a result of this at least partial independence of the power dissipation on the load, a high stability of the measurements is achieved.

In a further advantageous embodiment the given predetermined value represents a minimum relative to different power values which are obtained for a load range within the measurement capability of the force-measuring device, in particular for the entire load range of which the device is capable. This allows the temperature difference between the coil and the ambient temperature to be kept at as low a level as possible, because it avoids a generation of excess heat.

With preference, the force-measuring device includes a current-measuring device which measures the force-compensation current or -currents so that dependent on the measured values the currents through the windings can be controlled and/or regulated.

According to a further embodiment the force-measuring device includes a power estimator which serves to determine the power in the coil that is required at any given moment for generating the compensation force. It is further preferred to calculate and/or estimate the power of the coil based on the sum of the partial currents, using in particular the formula:

$$P0 = R \times (I1+I2)^2,$$

wherein R represents the total resistance of the coil and I1, I2 represent the partial currents of the coil windings (W1, W2) that run parallel to each other. The total resistance R of the coil based on the parallel arrangement of the two coil windings is obtained with the formula:

$$R = \frac{1}{\left(\frac{1}{R1} + \frac{1}{R2}\right)}$$

Next, the given predetermined value Ptg for the control and/or regulation is derived from the momentary power P0. In this way, the control can be established in a simple and efficient manner.

It is particularly advantageous if the given predetermined value Ptg represents the power of the coil at maximum compensation force.

Preferably, the force-measuring device is equipped with a suitable control- and/or regulation device which allows the at least two currents to be generated as largely continuous currents. This control- and/or regulation device can be assembled from a plurality of discrete circuit elements or from integrated circuits, or it can be implemented in the form of program parts in a microprocessor. Especially with a high degree of integration, it is possible to realize a particularly cost-effective design of the control- and/or regulation device.

In a further embodiment the force-measuring device has a control quantity generator for the purpose of calculating a control quantity which serves to control and/or regulate the partial current sources and which, being constituted in particular as a nonlinear function, depends on the power P0 required to generate the compensation force at any point in time.

Preferably, the force-measuring device includes a power distributor, in particular a digital potentiometer, which serves to control and/or regulate the partial current sources in accordance with the control quantity. This allows a cost-effective design to be achieved with standardized components.

In a further preferred embodiment the control quantity generator is configured in such a way that the control quantity x is calculated according to the formula $$x = a - b\sqrt{P^*} + c\sqrt{(P^*-1)},$$

wherein a, b and c represent given constants and P* represents the normalized power of the coil, which is calculated as $$P^* = \frac{Ptot}{P0}$$

in terms of the full-load power Ptot and the momentary power P0 of the coil. The momentary power P0 in this context is the amount of power needed to generate the compensation force which is required at any point in time.

In a further preferred embodiment, each of the partial current sources is connected directly to a respective coil winding to supply the latter with current. This allows the currents in the respective coil windings to be controlled and/or regulated directly and thus in a particularly efficient manner.

Furthermore, the partial current source is advantageously equipped to supply the at least one coil winding with a direct current in accordance with a given offset voltage.

In an advantageous embodiment, the force-generating coil is divided into a plurality of parts, preferably two parts, with separate, parallel controls, wherein the windings of the coil parts preferably have the same number of turns. This means that each of the windings is capable of producing a contribution to the compensation force, and if the windings are operated in parallel, the sum of the partial currents $I = \Sigma I_i$ constitutes the compensation current required to generate the compensation force. With this kind of force-generating coil consisting of more than one part, preferably two parts, each of the parts is supplied separately from a partial current source, a so-called current booster. The arrangement further includes a current-measuring device which measures the compensation current required to hold the moving parts of the force-measuring device in balance. Using a power estimator which is based on this compensation current, the compensation force required to bring the force-measuring device into balance is generated by appropriately controlling the coil parts with the help of a power distributor in such a way that the power of the entire coil is held constant at a minimal value independent of the compensation force required any point in time.

In an advantageous embodiment, the at least two currents are controlled and/or regulated simultaneously in accordance with a control quantity that is dependent on the momentary power of the compensation current of the coil. This simplified concept opens the possibility to reduce the complexity of the control and thus build a particularly cost-effective and stable circuit.

In a further advantageous embodiment, the total power generated in the coil at the maximal compensation current is:

$$Ptot = \sum R_i \times I_i^2$$

wherein $R_i$ stands for the resistance values and $I_i$ stands for the partial currents of the coil windings that run parallel to each other.

As the compensation current Icp represents the actual weighing signal w, this current value needs to be measured and, if necessary, converted and evaluated. Based on the value for Icp, the coil power P0 which has to be released in order to generate the compensation force as required at the moment is determined by the elementary equation $$P0 = R \times I_{cp}^2$$

wherein R represents the ohmic equivalent impedance of the entire coil and Icp represents the momentary compensation current.

In a particularly advantageous embodiment, the current strengths $$I1 = x \times I + Ioffset1$$

$$I2 = (1-x) \times I - Ioffset2$$

in a coil with two coil parts are controlled in accordance with at least one nonlinear function that is dependent on the total power.

Preferably, this function is determined in essence by the following formula:

$$x = a - b\sqrt{P^*} + c\sqrt{(P^*-1)},$$

wherein a, b and c are constants and P*=Ptot/P0 represents the ratio between the full-load power Ptot of the coil at the maximal compensation current and the power P0 required at any point in time to generate the compensation force. What is accomplished with this profile of the function is that the total coil power will have an optimal degree of independence on the weighing load. It is also conceivable to use other suitably designed function profiles that have similar characteristics, for example composites of simple or higher-order polynomials or of exponential functions.

This calculation is preferably performed by a control device and/or regulation device which is arranged in the force-measuring device. For example, these operations can be performed through an analog process by means of simple circuits or through a digital process by means of a small number of computational steps in a microprocessor.

In a particularly advantageous embodiment, an offset current is superimposed on each of the two coil currents. These currents have the purpose that a constant level of power is generated in the coil even when the compensation current is small. In a preferred implementation of this concept the control- and/or regulation device has a partial current source dedicated to each coil winding and connected to the latter in order to supply the winding with a direct current in accordance with a given offset voltage.

The device according to this embodiment always maintains the ability to bring the movable part of the force-measuring device into a balanced state, regardless of whether or not the compensation current changes polarity between its minimum and maximum values.

In a further embodiment, the control- and/or regulation device includes at least two switching elements that serve to modulate the partial currents into a substantially pulse-shaped form, wherein in the time profile of the partial currents a time interval can be prescribed during which the partial currents are flowing simultaneously. Using the switching elements it is possible to generate an additional amount of heat with simple and cost-effective means.

The basis for the time profile is a periodic process characterized by the length of a period. In this process, a period is defined by the simultaneous periodic switching of the switching elements whereby the switching of the two partial currents is performed. With this simultaneous actuation of the switching elements there is no additional heat being generated, so that this operating mode reflects the state of the art. Furthermore, for this operating mode, an effective time interval t* is defined during which the first partial current flows through the first winding. From the effective time interval t* and the period length ts, the weighing signal w can be determined in accordance with the ratio $$w = \frac{t^*}{ts}$$

Thus, the weighing signal is connected directly to the applied force.

According to the disclosed embodiments, in order to generate an additional amount of heat the first control signal is switched with a delay relative to the end of the effective time interval t*. The length of the delay is referred to as a first time interval tp1, i.e. the switching occurs at the time t*+tp1. Likewise, the second control signal is not being switched at the beginning or at the end of a period ts, but delayed by a second time interval tp2, i.e. at the time ts+tp2. These events repeat themselves periodically at the times 0, ts, 2ts, 3ts, etc. Accordingly, there are within each period ts a first time interval tp1 and a second time interval tp2 during which the control signals overlap. During these time intervals, the first partial current and the second partial current are thus flowing simultaneously through the first and second windings, respectively. This has the consequence that during these time intervals, heat is generated in a force-neutral way in the windings.

Preferably, the first time interval tp1 and the second time interval tp2 are selected to be identical, so that there is symmetry between the first control signal SWI1 and the second control signal SWI2. This symmetry is achieved through a largely identical choice for the two delay values tp1 and tp2 in the form of a common delay value tp.

With preference, the common delay value tp is calculated according to the following formula:

$$tp = ts \times \left( -\frac{1}{2} + \sqrt{\frac{1}{4} + w(1-w)} \right)$$

wherein ts represents the period length and w represents the weight signal. Through the value w, the delay value tp thus depends on the applied force L.

In an advantageous embodiment, the control- and/or regulation device includes at least one delay element which is connected to at least one switching element for the purpose of controlling the switching element by means of a control signal, wherein the control signal depends on a delay value which corresponds to the time interval. This provides a simple way to generate the control signals.

In a further advantageous embodiment, the control- and/or regulation device includes an arithmetic unit which allows the delay value to be calculated dependent on the applied force, wherein the arithmetic unit is connected to the delay element so as to transmit the calculated delay value to the delay element. This arrangement offers a simple way to incorporate complex relationships in the regulation.

In a further preferred embodiment, the force-measuring device includes a measuring unit which is connected to the arithmetic unit for the purpose of transmitting to the arithmetic unit a measuring signal dependent on the applied force, from which the load-dependent delay value can be calculated in the arithmetic unit.

The embodiment can also be used in designs with coils that have more than two coil windings. For example in a coil with three coil windings, two of the windings can generate a force in one direction while the remaining winding generates a force in the opposite direction. In the case of coils with four coil windings, the forces could be combined in a similar way.

BRIEF DESCRIPTION OF THE DRAWINGS

Details of the method and the device that embody the inventive concept will be apparent from the description of the embodiments which are presented in a very schematic way in the drawings, wherein.

DETAILED DESCRIPTION OF THE DRAWINGS

Figure 1:
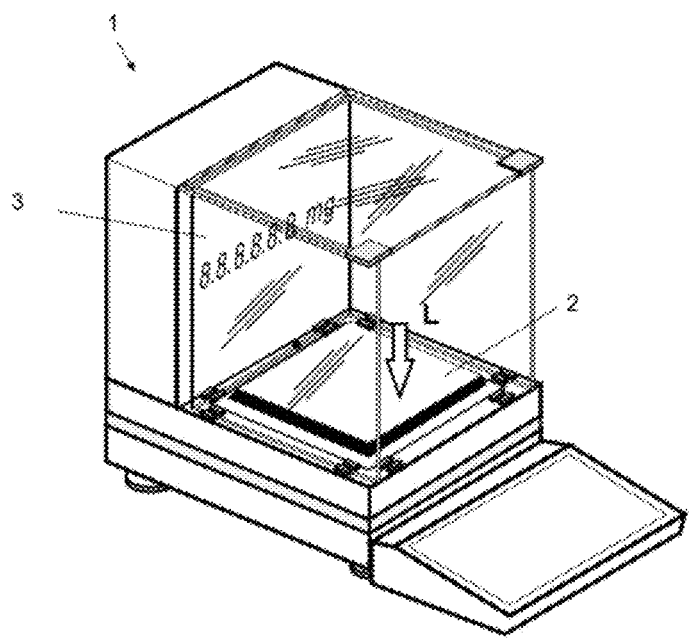
FIG. 1 depicts a balance 1 which, in regard to its design, may serve as an example, with a symbolically indicated load L, weighing pan 2, and indicator unit 3.

FIG. 1 shows an example of a force-measuring device in the form of a balance 1 with a symbolically indicated load L. In the case of a balance, the force L that is to be measured is typically the weight or weighing load of the weighing object to be measured, which acts on the weighing pan 2. The objective for the balance 1 is to arrive at an accurate and stable output value for the applied force L which is displayed on the indicator unit 3, for example a digital liquid crystal display.

Figure 2:
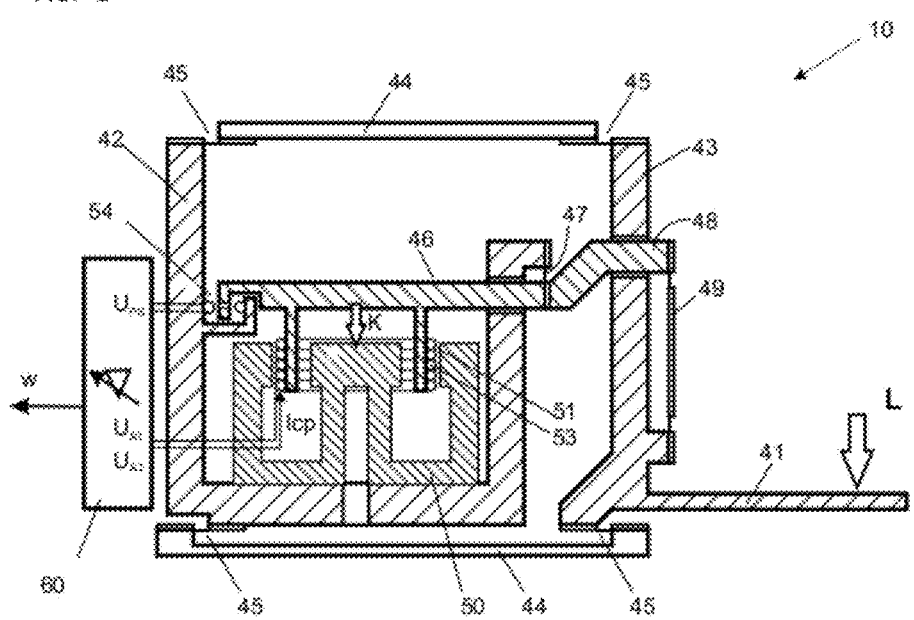
FIG. 2 illustrates the principle of a force-measuring cell 10 which is based on the concept of electromagnetic force-compensation, shown in a cross-sectional view, with a coil 53 arranged to move in the air gap 51 of a magnet system 50.

In a strongly simplified cross-sectional drawing, FIG. 2 illustrates a force-measuring cell 10 which is based on the principle of electromagnetic force-compensation and suitable for use in the field of weighing technology. The force-measuring cell 10 includes a force-transmitting mechanism with a parallel-guiding linkage having a stationary part 42 and a vertically displaceable part 43 which are linked to the ends of a pair of guide members 44 through flexures 45. The vertically displaceable part 43 carries a weighing pan in the form of a cantilevered extension 41 which serves to receive a load L (indicated schematically) which is to be measured. The normal component of the force produced by a load L is transmitted from the vertically displaceable part 43 through a coupling element 49 to the short lever arm 48 of the lever 46. The lever 46 is supported by means of a flexure fulcrum 47 on a portion of the stationary part 42. The force-measuring cell further includes a cup-shaped magnet system 50 which contains an air gap and is attached to the stationary part 42 with a fixed connection. Arranged in the air gap 51 is a coil 53 which is connected to the longer lever arm of the lever 46. The coil 53 carries an electrical current, the so-called compensation current Icp, whose magnitude depends of the force that is acting on the lever 46. The position of the lever 46 is measured by a position-measuring device 54 which is connected to a control- and/or regulation device 60. The control and/or regulation device 60 controls and/or regulates the compensation current Icp based on the measuring signals received from the position-measuring device 54 in such a way that the lever 46 is always held in the same position or is returned to the same position after a change in the load has occurred.

According to this measurement principle, the electromagnetic coil produces a force which acts on the lever, the so-called compensation force K which opposes the applied force L. The compensation current Icp generating the compensation force K represents a measure for the applied force L that is to be measured. By determining the magnitude of this compensation current Icp, followed by appropriate signal processing, a weighing signal w is generated which is transmitted to the indicator unit of the balance where it is displayed as the corresponding measurement value. However, the weighing signal w can also be passed on to a further processing unit, for example a lead computer, a system controller or a remotely located controller unit.

The electromagnetic coil 53 consists of one or more windings of an electrically conductive and insulated coil wire. In the simplified representation of FIG. 2, only a few turns of the coil wire are indicated schematically. Typically, however, the coil 53 has windings with a large number of turns, for example several hundred.

Depending on the variable magnitude of the applied force L, a compensation current Icp varying in a corresponding manner is sent through the coil 53. As a result a load-dependent momentary power P0 is generated in the coil 53 which accordingly acts as a heat source. This heat source causes a corresponding temperature change of the affected components, in particular the coil 53 and the magnet system 50. By using a load-independent amount of power, the embodiments aim to keep the additional temperature increase and its distribution in the force-measuring device at the most constant and lowest level possible.

Figure 3:
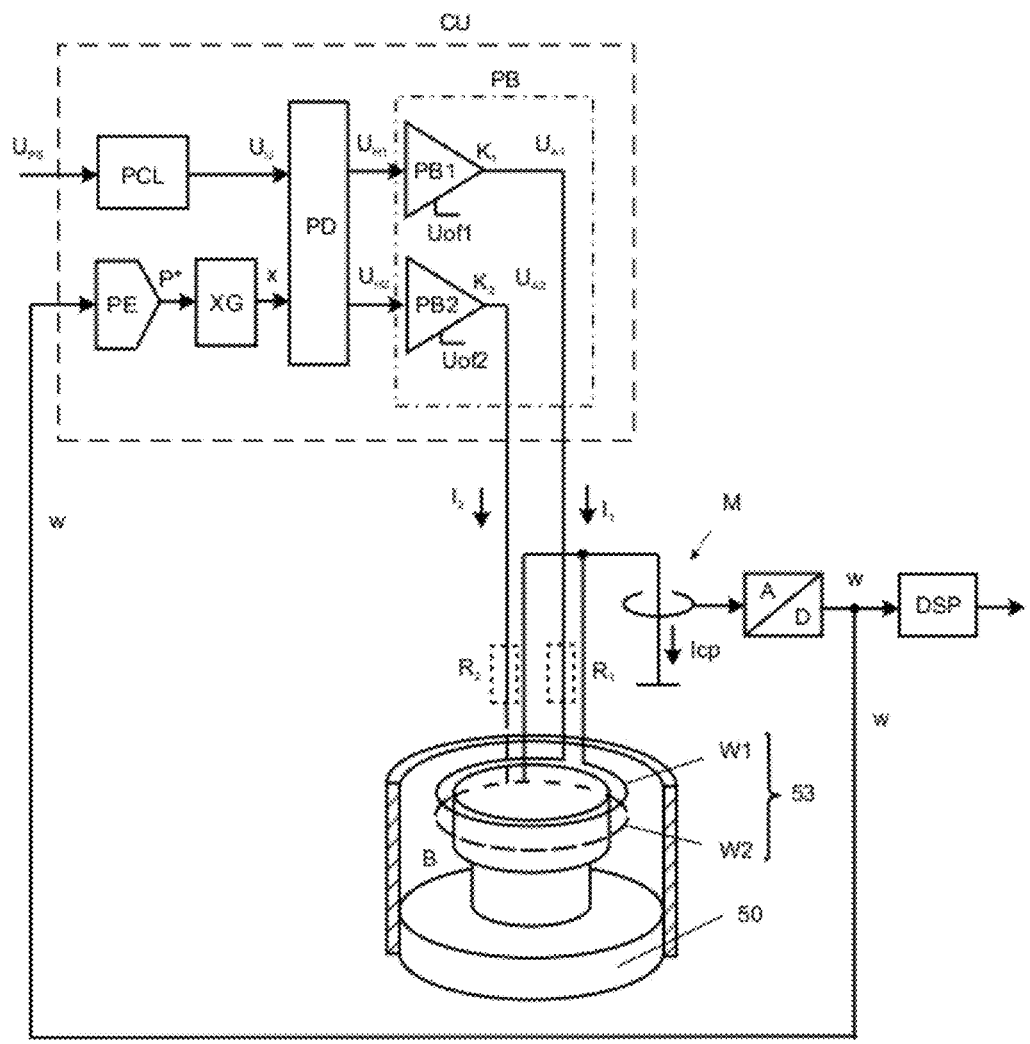
FIG. 3 depicts, as an example, a schematic block diagram of the control- and/or regulation device CU, a current-measuring device M, signal-processing stages A/D and DSP, a schematically drawn magnet system 50 and a coil system 53 in accordance with FIG. 2, which has two coil windings W1 and W2.

As an example, FIG. 3 shows a schematic block diagram of a control- and/or regulation device CU, a current-measuring device M, a signal-processing unit in the form of an analog/digital converter A/D and a digital signal-processing unit DSP, a schematically drawn magnet system 50 with a coil 53 in accordance with FIG. 2, which has two coil windings W1 and W2. The cup-shaped magnet system 50 generates in its air gap a magnetic field B which surrounds the first coil winding W1 and the second coil winding W2. For better clarity, the magnet system 50 is shown with its cylindrical shell cut open.

Each of the coil windings W1 and W2 of the coil 53 is indicated symbolically by a single turn, while in reality the coil windings typically have a large number of turns. The first coil winding W1 is indicated as a solid line and the second coil winding W2 as a broken line.

The measuring signal $U_{PS}$ generated by the position-measuring device is sent to a position control device PCL where it is evaluated and, if necessary, processed into a suitable form to be transmitted. The output of the position control device PCL is connected to a first input of a power distributor PD, so that the position regulator output signal $U_U$ of the position control device PCL is available as the first input variable for the power distributor PD. In this arrangement, the position regulator output signal $U_U$ corresponds to the measurement signal $U_{PS}$ received as input from the position-measuring device, so that the power distributor PD receives an input quantity which depends on the force L acting on the force-measuring device.

The power distributor PD is connected at its output side to two partial current sources PB1 and PB2, so-called current boosters, so that the control voltages $U_{H1}$ and $U_{H2}$ generated by the power distributor PD can be sent independently of each other to the partial current sources PB1 and PB2.

Using a first amplification factor K1, the first partial current source PB1 generates a first coil voltage $U_{A1}$ which is present at the output of the first partial current source PB1. The output terminal of the first partial current source PB1 is connected to a first connector terminal of the first winding W1, and the second connector terminal of the first winding W1 is connected to a ground potential. The line resistance of the first winding W1, the so-called first coil resistance R1 is represented in the form of an equivalent circuit element as a resistor (dotted line). Now, if the first connector terminal of the winding W1 is held at the first coil voltage $U_{A1}$, a first current I1 which is generated by the partial current source PB1 and whose magnitude depends on the first coil resistance R1 will flow through the first winding W1 to the ground potential.

In the same way as the first partial current source PB1 and independently of the latter, the second partial current source PB2 is connected to the second winding W2 of the coil. Likewise, using a second amplification factor K2, a second coil voltage $U_{A2}$ is generated by the second partial current source PB2, so that a second current I2 which is generated by the partial current source PB2 and whose magnitude depends on the second coil resistance R2 will flow through the second winding W2 to the ground potential.

The first partial current source PB1 and the second partial current source PB2 can be combined into a current supply device PB as indicated by a dash-dotted line.

The connection of the first winding W1 to ground potential and the connection of the second winding W2 to ground potential are combined into a common conductor line, so that the coil currents I1 and I2 are joined together in this part of the circuit and the sum of the coil currents I1 and I2 forms the compensation current Icp which flows to ground potential.

The magnitude of the summation current, i.e. the compensation current Icp, represents a measure for the compensation force K generated in the coil and thus a measure for the force L acting on the force-measuring device. Accordingly, the compensation current Icp is measured by means of a current-measuring device M, and the corresponding measuring signal is generated in the form of a weighing signal w which is converted into a digital format by means of an analog/digital converter. In a digital signal-processing unit DSP arranged downstream of the A/D converter the weighing signal w is subjected to further processing. The digital signal-processing unit DSP can include for example an amplifier, a low-pass filter, or a normalizer. At the output of the digital signal-processing unit DSP, the finished weighing signal is now available for further use, for example to be presented on a display or to be transmitted to a lead computer.

The output of the analog/digital converter A/D is connected to a power estimator PE, so that a digital weighing signal w corresponding to the compensation current Icp is presented at the input of the power estimator PE. The power estimator PE estimates the power P0 that is needed in the coil at that moment for generating the compensation force in accordance with the following formula $$P0 = R \times I_{cp}^2$$

wherein R represents the total resistance of the coil 53 and Icp represents the magnitude of the compensation current corresponding to the weighing signal w. As the two windings W1 and W2 are parallel to each other in the circuit, the total resistance R of the coil is found with the formula:

$$R = \frac{1}{\left(\frac{1}{R1} + \frac{1}{R2}\right)}$$

wherein R1 represents the first coil resistance and R2 the second coil resistance. In the case where the resistance values R1 and R2 are equal, R will be equal to one-half of the first coil resistance:

$$R = \frac{R1}{2}$$

In addition, the power estimator PE performs the function of normalizing the momentary power P0 in the coil in terms of a normalizing constant Ptot according to the relationship:

$$P^* = \frac{Ptot}{P0}$$

wherein P* represents the normalized power of the coil and Ptot represents the total power of the coil at full load.

In the case of a force-measuring device, where the term "zero load" defines the operating condition where no force is acting on the force-measuring device while "full load" defines the operating condition where the applied force L equals a specified maximum of the measurable force, the full-load power Ptot can be calculated according to the formula:

$$Ptot = R \times IU^2$$

wherein IU represents the compensation current Icp at full load.

Accordingly, the normalized power P* of the coil lies between the values of infinity for zero load and 1 for full load.

The output of the power estimator PE is connected to an input of a control quantity generator XG, so that a value corresponding to the normalized power P* of the coil can be transmitted to the control quantity generator XG.

In the case at hand, the control quantity generator XG calculates from the input quantity, i.e. from the normalized power P*, a control quantity x according to the following equation:

$$x = \frac{1}{2} - \frac{1}{2}\sqrt{P^*} + \frac{1}{2}\sqrt{(P^* - 1)},$$

Accordingly, the value of the control quantity x lies between the value of ½ at zero load and the value of 0 at full load.

The output of the control quantity generator XG is connected to a second input of the power distributor PD in order to transmit the calculated control quantity x to the power distributor PD, so that the latter receives the control quantity x as a second input quantity.

In the power distributor, the two aforementioned control voltages UH1 and UH2 are determined from the control quantity x and the position regulator output signal $U_U$ described above in accordance with the following equations:

$$U_{H1} = U_U \times x + U_{of1}$$

$$U_{H2} = U_U \times (1-x) + U_{of2}$$

After the two control voltages $U_{H1}$ and $U_{H2}$ have been determined, the quantities through which the afore-described partial current sources PB1 and PB2 are controlled are now available. Consequently, this closes the loop to allow the power distributor PD to function in the manner described above.

Accordingly, this circuit arrangement represents two control loops, i.e. a first control loop for the regulation of the compensation force K and a second control loop for the distribution of the currents in such a way that the total power Ptot generated in the windings W1, W2 is essentially constant over a range of different strengths of the compensation force K.

The individual components of the circuit can be appropriately combined with each other, for example as a control- and/or regulating unit CU (indicated by a broken line). Furthermore, the components of the circuit, in particular the power estimator PE and the control quantity generator XG, can be implemented as functional blocks in an integrated circuit or as program parts in a microprocessor. The control- and/or regulation device CU can thus be built using an analog or digital design or any kind of mixed configuration.

In a particularly advantageous embodiment, the first partial current source PB1 generates the first current I1 with an additional first offset voltage Uof1 of a prescribed fixed magnitude. Analogously, the second partial current source PB2 generates the second current with an additional second offset voltage Uof2 of a prescribed fixed magnitude. Thus, the following currents I1 and I2 flow, respectively, through the windings W1 and W2:

$$I1 = \frac{K1}{R1} \times (x \times U_U + U_{of1})$$

$$I2 = \frac{K2}{R2} \times ((1-x) \times U_U + U_{of2})$$

wherein Uof1 and Uof2 represent the offset voltages and the further symbols in the equations are the same as defined previously herein.

Preferably, the offset voltages Uof1 and Uof2 are determined according to the following equations in terms of the summation current IU at full load:

$$U_{of1} = R1 \times \frac{IU}{(K1 \times 2)}$$

and $$U_{of2} = -R2 \times \frac{IU}{(K2 \times 2)}$$

wherein IU represents a coil current which would occur under full load in a state-of-the-art force-measuring device.

Thus, as a result of the additional offset voltages Uof1 and Uof2 a direct current is superimposed on each of the currents I1 and I2.

Figure 4A:
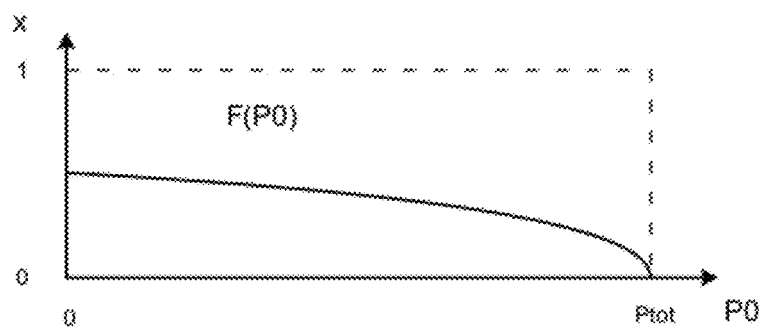
FIG. 4 shows: a) an example for the shape of the function x(P0), i.e. the control variable x as a function of the power P0 which is required at any point in time to generate the compensation force; b) the coil voltage $U_{A1}$ and $U_{A2}$ associated with the example of FIG. 4a; c) the currents $I_{A1}$ and $I_{A2}$ associated with the example of FIG. 4a; and d) the associated total power Ptot of the coil system.

FIG. 4a shows an example for the shape of the function F(P0), i.e. the control variable x as a function of the power P0 which is required in the coil at any point in time to generate the compensation force. In the graph, the control quantity x is represented as the ordinate and the power P0 which is required at a given point in time to generate the compensation force is represented as the abscissa. The profile of the function F(P0) corresponds to the previously described equation $$x = \frac{1}{2} - \frac{1}{2}\sqrt{P^*} + \frac{1}{2}\sqrt{(P^*-1)}$$

with $$P^* = \frac{Ptot}{P0}$$

wherein P* represents the normalized power of the coil, the full load power Ptot represents the normalization constant, and P0 represents the power required at any point in time.

At zero load, i.e. when P0=0, the control quantity x assumes its maximum value of x=½. At full load (P0=Ptot) the control quantity x assumes is minimum value of x=0. The profile of the function F(P0) is nonlinear.

Figure 4B:
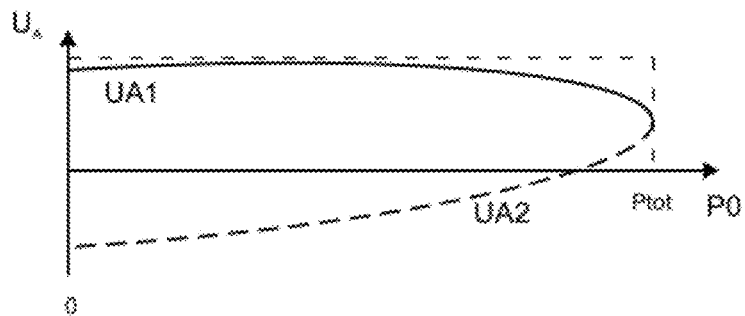

FIG. 4b shows the profiles of the two coil voltages UA1 and UA2 which correspond to the control quantity x of FIG. 4a) and which are generated, respectively, by the partial current sources PB1 and PB2. In this diagram, the coil voltage UA is represented as the ordinate axis and the power P0 that is required at any point in time to generate the compensation force is represented as the abscissa. The profile of the first coil voltage $U_{A1}$ is indicated by a solid line, and the profile of the second coil voltage $U_{A2}$ is indicated by a broken line.

Figure 4C:
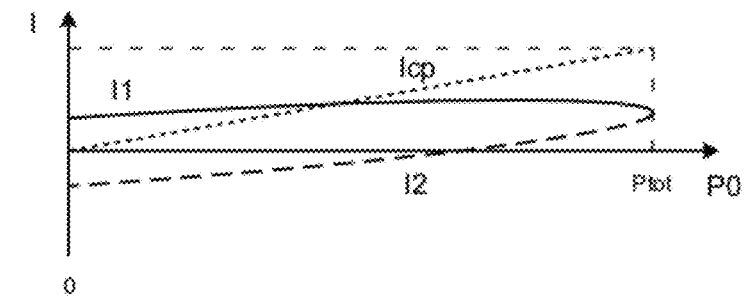

FIG. 4c shows the profiles of the two currents I1 and I2 which flow as a result of the voltages $U_{A1}$ and $U_{A2}$ which are shown in FIG. 4b) and are applied, respectively, to the first winding W1 and the second winding W2. In the graph, the current I is measured along the ordinate and the power P0 required at any point in time to generate the compensation force is measured along the abscissa. The graph of the first current I1 is drawn as a solid line, and the profile of the second current I2 is drawn as a broken line. In addition, the profile of the compensation current Icp, i.e. the sum of the two currents I1 and I2 is represented by a dotted line.

Figure 4D:
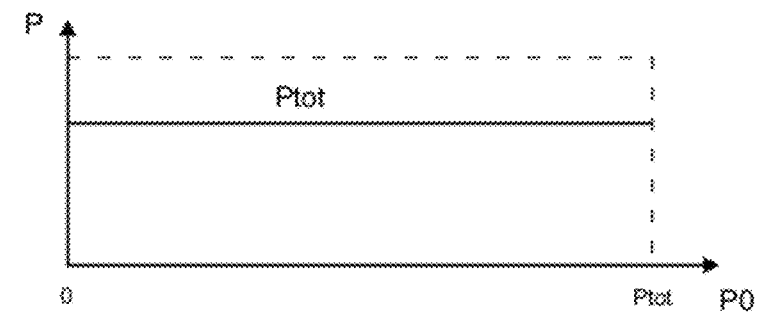

Finally, FIG. 4d represents the profile of the total power Ptot generated in the coil 53, with Ptot being measured along the ordinate and the power P0 required at any point in time to generate the compensation force being measured along the abscissa. The power Ptot is constant over the entire range and is thus independent of the applied load.

Figure 5:
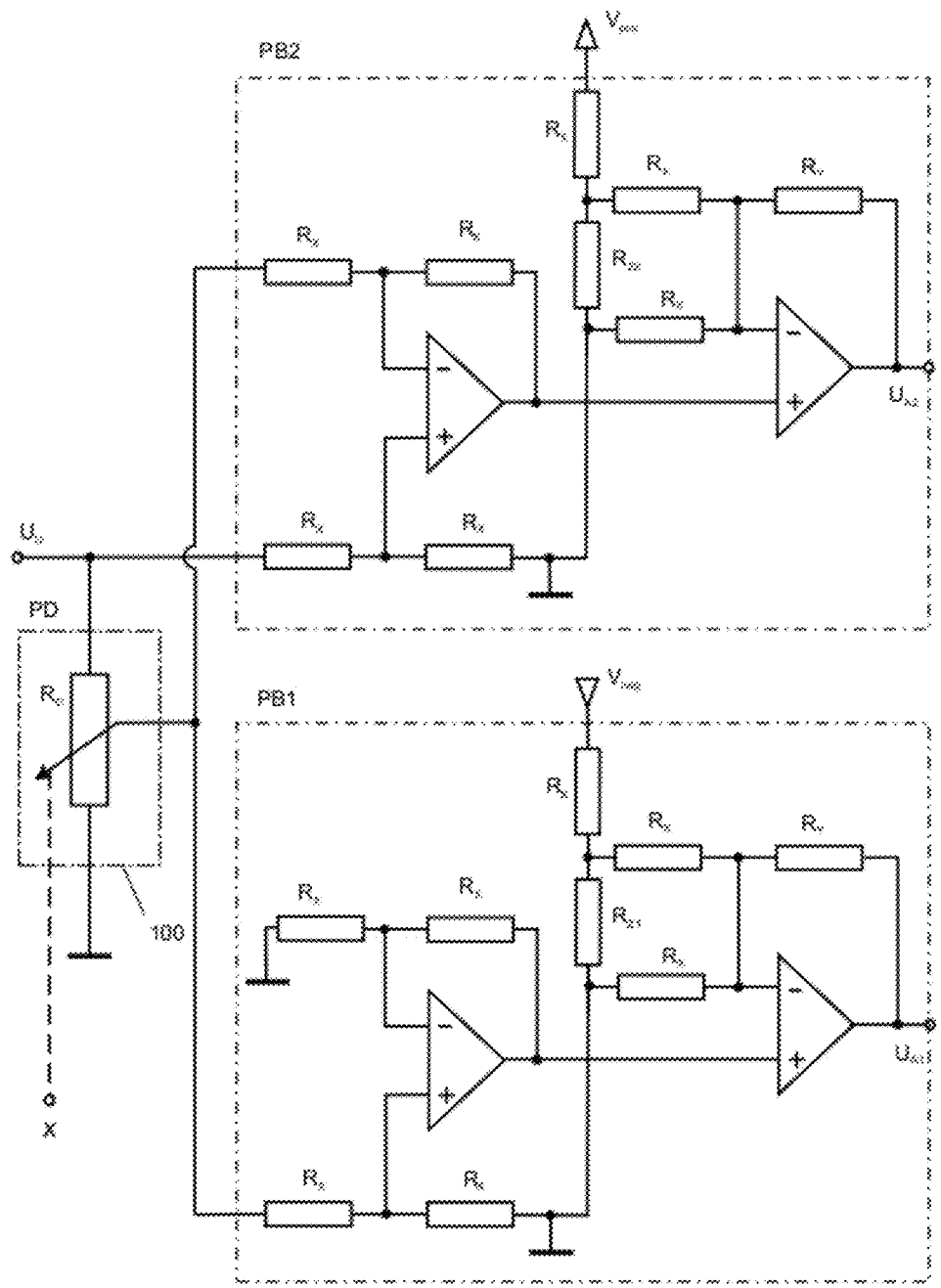
FIG. 5 represents a detail of the block diagram of FIG. 3, simplified and meant as an example, with a power distributor PD in the form of a digital potentiometer and, downstream of the latter, two partial current sources PB1 and PB2.

FIG. 5 shows a detail of the block diagram of FIG. 3, simplified and meant as an example, with a power distributor PD in the form of a digital potentiometer and, downstream of the latter, two partial current sources PB1 and PB2.

The two partial current sources PB1 and PB2 are both configured in the same way. Each partial current source includes a conventional series arrangement of two operational amplifiers with feedback loops. The first partial current source PB1 is connected to a negative current supply Vneg, and the second partial current source PB2 is connected to a positive current supply Vpos. Through the selection of the resistance values Rx, Ry and Rz1, Rz2, the amplification factors K1 and K2 and the offset voltages Uof1 and Uof2 can be established according to the following relationships:

$$K1 = \frac{R_y}{R_x}$$

$$K2 = \frac{R_y}{R_x}$$

$$U_{of1} = -\frac{Rz1}{(Rz1 + Rx)} \times Vneg$$

$$U_{of2} = -\frac{Rz2}{(Rz2 + Rx)} \times Vpos$$

The two coil voltages UA1 and UA2 are present at the outputs of the partial current sources PB1 and PB2, respectively, to be delivered to the respective windings W1 and W2.

The inputs of the two partial current sources are connected to the output of the digital potentiometer. The digital potentiometer, functioning as a voltage divider, generates an output voltage which lies between the position regulator output signal UU and ground potential.

In the power distributor the two control voltages $U_{H1}$ and $U_{H2}$ described above are determined from the control quantity x and the previously described position regulator output signal $U_U$ according to the following equations:

$$U_{H1} = U_U \times x + U_{of1}$$

$$U_{H2} = U_U \times (1-x) + U_{of2}$$

Figure 6:
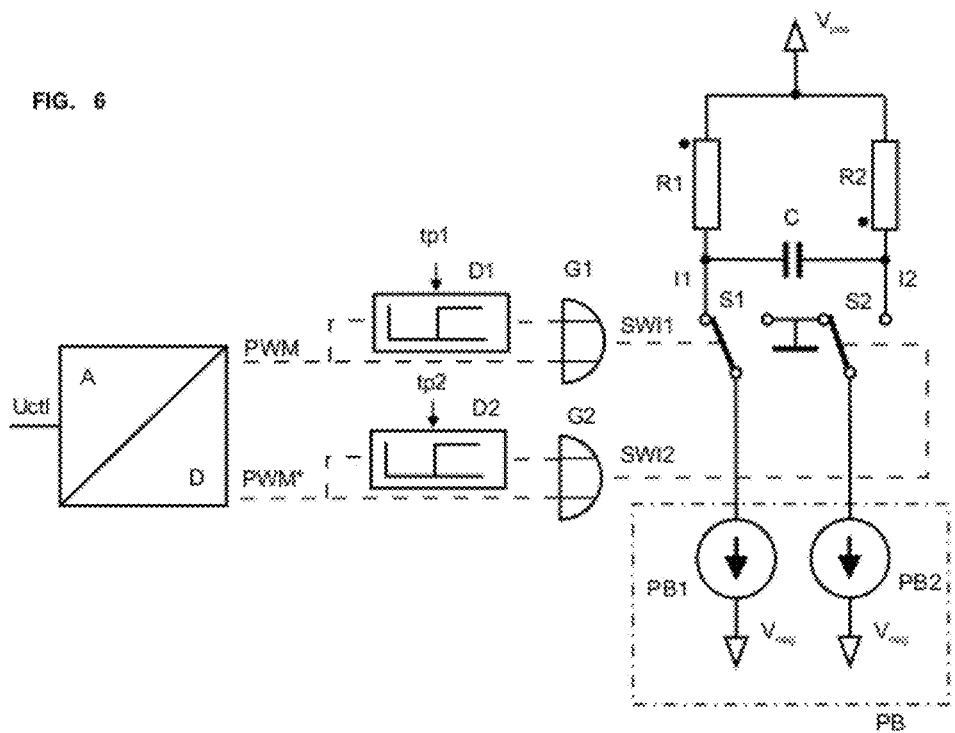
FIG. 6 represents a strongly simplified block diagram of a further embodiment with switching elements S1, S2, which are controlled, respectively, by control signals SWI1 and SWI2 in order to supply pulse-shaped currents to the associated coils.

FIG. 6 represents a strongly simplified block diagram of a further embodiment with switching elements S1, S2, which are controlled and/or regulated, respectively, by control signals SWI1 and SWI2 in order to supply pulse-shaped currents to the associated coils.

The first coil and the second coil are represented by their respective resistance values, i.e. the first coil resistance R1 and the second coil resistance R2. The first winding with the resistance R1 is connected on one side to a positive supply voltage Vpos and on the other side to a first connector terminal of a first switching element S1. The second connector terminal of the first switching element S1 is connected by way of a first partial current source PB1 to a negative supply voltage Vneg. The first switching element S1 is configured as a two-way switch which has three connector terminals, wherein the third connector terminal is connected to the common circuit potential. Consequently, the connection from the first partial current source PB1 can be switched between the first winding with the resistance R1 and the common circuit potential. In a first switch position, the first winding with the resistance R1 is connected to the first partial current source PB1, so that a first partial current I1 flows through the first winding with the resistance R1.

The circuit arrangement for the second winding with the coil resistance R2 is analogous to the first winding with the coil resistance R1. Thus, the connection from the second partial current source PB2 can be switched between the second winding represented by R2 and the common circuit potential. In this case, when the switch S2 is in its second position, the second winding with the coil resistance R2 is connected to the second partial current source PB2, so that a second partial current I2 flows through the second winding with the resistance value R2.

As in the preceding examples, the two coils are connected into the circuit in such a way that for partial currents I1, I2 flowing in the same direction, the forces being generated are of opposite direction (this polarity of the configuration of the coil terminations is indicated by black dots). Furthermore, the terminations of the two coils towards the switching elements S1 and S2 are connected to each other through a capacitor C.

The switching elements S1 and S2 are individually controlled, using a control voltage UctI which is entered into an analog/digital converter A/D. The analog/digital converter generates a first pulsewidth-modulated signal PWM and a second pulsewidth-modulated signal PWM*.

The first output of the analog/digital converter A/D is connected on the one hand to the first input of a first gate G1 and on the other hand to the first input of a first delay element D1, so that the first gate G1 and the first delay element D1 receive the first pulsewidth-modulated signal PWM. A signal representing a first delay value tp1 is entered into the second input of the first delay element D1 in order to control the time delay of the first delay element D1. The output of the first delay element D1 is connected to the second input of the first gate G1. The output of the first gate G1 now delivers the first control signal SWI1 which serves to control the first switching element S1

Analogous to the first output, the second output of the analog/digital converter is connected to the second switching element S2 by way of a second delay element D2 and a second gate G2 in order to generate from the second pulsewidth-modulated signal PWM* a second control signal SWI2 with a second delay value tp2 for the control of the second switching element S2.

Figure 7:
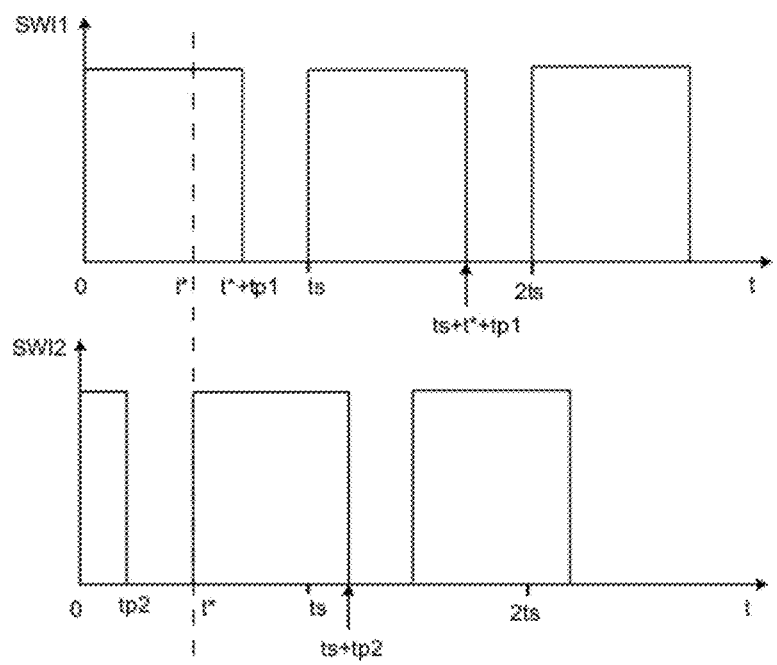
FIG. 7 represents, in strongly simplified form, the time graphs of the control signals SWI1 and SWI2 that are indicated in FIG. 6.

With a suitable selection of the first delay value tp1 and the second delay value tp2 the time profile of the first control signal SWI1 can be changed in relation to the time profile of the second control signal SWI2. The time profiles of the control signals SWI1 and SWI2 are shown in a strongly simplified form in FIG. 7.

The basis for the time profile is a periodic process characterized by the length of a period ts. In this process, a period is defined by a periodic switching of the switching elements S1 and S2 and thus by the periodic switching-over between the two partial currents in the case where the switching elements S1 and S2 are actuated simultaneously. With the simultaneous actuation of the switching elements S1 and S2, there is no additional heat being generated, so that this operating mode reflects the state of the art. Furthermore, for this operating mode, an effective time interval t* is defined during which the first partial current I1 flows through the first winding with the coil resistance R1. From the effective time interval t* and the period length ts, the weighing signal w can be determined in accordance with the ratio $$w = \frac{t^*}{ts}$$

Thus, the weighing signal w is connected directly to the applied force.

During this effective time interval t* the flow of the second partial current I2 is interrupted, except for a charge-balancing current through the capacitor C. At the end of the effective time interval t* the two switching elements S1 and S2 are actuated simultaneously under this operating mode, so that during the remaining time interval ts−t*, the second partial current I2 flows through the second coil with the coil resistance R2. Finally, at the end of the period ts, the two switching elements S1 and S2 are switched back to their original position and thus a new period begins.

In order to generate an additional amount of heat the first control signal SWI1 is switched with a delay relative to the end of the effective time interval t*. The length of the delay is represented by a first time interval tp1, i.e. the switching occurs at the time t*+tp1. Likewise, the second control signal SWI2 is not being switched at the beginning or at the end of a period ts, but delayed by a second time interval tp2, i.e. at the time ts+tp2. These events repeat themselves periodically at the times 0, ts, 2ts, 3ts, etc. Accordingly, there are within each period ts a first time interval tp1 and a second time interval tp2 during which the control signals overlap. During these time intervals, the first partial current I1 and the second partial current I2 are thus flowing simultaneously through the first and second windings with the resistance values R1 and R2, respectively. This has the consequence that during these time intervals, heat is generated in a force-neutral way in the windings.

Preferably, the first time interval tp1 and the second time interval tp2 are selected to be identical, so that there is symmetry between the first control signal SWI1 and the second control signal SWI2. This symmetry is achieved through a largely identical choice for the two delay values tp1 and tp2 in the form of a common delay value tp.

With preference, the common delay value tp is calculated according to the following formula:

$$tp = ts \times \left( -\frac{1}{2} + \sqrt{\frac{1}{4} + w(1-w)} \right)$$

wherein ts represents the period length and w represents the weighing signal. Through the value w, the delay value tp thus depends on the applied force L.

Figure 8:
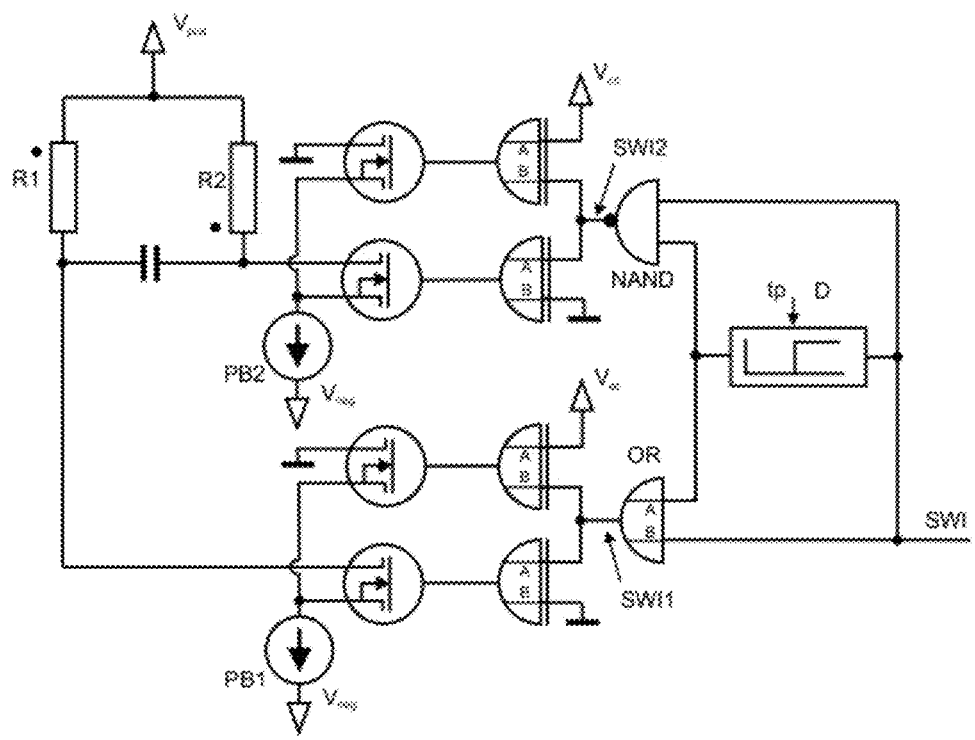
FIG. 8 represents an example of an electronic circuit implementation of the block schematic of FIG. 6, wherein the switching elements S1 and S2 are configured as switching transistors which are controlled by a single common control signal SWI.

FIG. 8 represents an example of an electronic circuit implementation of the block schematic of FIG. 6, wherein the switching elements S1 and S2 are configured as switching transistors with associated logic gates. In this arrangement, the first switching element S1 is formed by a pair of switching transistors arranged so that they will change simultaneously but in opposite directions between their respective open and closed states and by a pair of gates assigned to the switching transistors and arranged to complement each other, so that the connection of the first partial current source PB1 can be switched between the first winding (symbolized by its coil resistance R1) and the common circuit potential in accordance with the first control signal SWI1. The second switching element S2 is configured in the same way as the first switching element S1, so that the connection of the second partial current source PB2 can be switched between the second winding (symbolized by its coil resistance R2) and the common circuit potential in accordance with the second control signal SWI2.

The first control signal SWI and the second control signal SW2 are generated from a common control signal SWI means of a delay element D and two logic gates OR and NAND. The control signal SWI can be described in this case as that control signal which by itself would cause a simultaneous switchover between the two partial currents I1 and I2. Now, this control signal SWI is sent to the first input of the gate NAND as well as to the input of the delay element D and the second input of the gate OR. The output of the delay element D is connected to the second input of the gate NAND as well as to the first input of the gate OR, so that the common control signal SWI—retarded by the delay interval tp—is used to control the gates OR and NAND. The output signal of the gate OR represents the first control signal SWI1, while the output signal of the gate NAND represents the second control signal SWI2. The two control signals SWI1 and SWI2 are now used to control the switching elements S1 and S2, more specifically the pairs of complementary gates, as described above.

Figure 9:
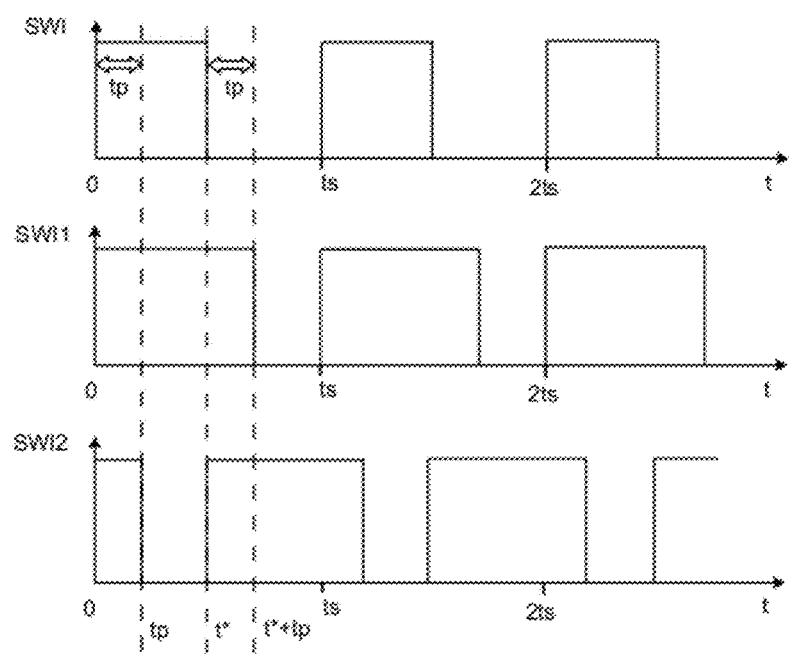
FIG. 9 represents, in strongly simplified form, the time graphs of the control signals SWI, SWI1 and SWI2 which are indicated in FIG. 8.

FIG. 9 represents, in strongly simplified form, the time profiles of the control signals SWI, SWI1 and SWI2 in accordance with in FIG. 8. From the control signal SWI, the first control signal SWI1 is generated by means of the gate OR and the second control signal SWI2 is generated by means of the gate NAND. In this arrangement, the descending flank of the first control signal SWI1 is delayed by the time interval tp in relation to the control signal SWI. Analogously, the descending flank of the second control signal SWI2 is also delayed by the time interval tp in relation to the control signal SWI. Thus, the situation that results is similar to FIG. 7 for the case that the first delay value tp1 and the second delay value tp2 are selected to be equal and thus correspond to the common delay value tp. Consequently, the common delay value tp can be determined in accordance with the equation described above.

What is claimed is:

1. A device for measuring a force which is based on the principle of electromagnetic force-compensation, comprising:
   a magnet system; and
   an electric coil, arranged to be movable in the magnet system, the coil having at least two windings, a current supply device which has at least two partial current sources, each of the windings having one of the partial current sources assigned to it; and
   a device that controls and/or regulates the current that the partial current sources supply to the windings so that, depending upon a magnitude of the force acting on the force-measuring device, the currents supplied are sent in such a way that:
      the two electromagnetic forces generated thereby are summed to form a compensation force; and that
      at the same time, the coil dissipates the power at a constant predetermined value.

2. The force-measuring device of claim 1, wherein:
   the constant predetermined value represents a minimum relative to different power values that are obtained for a load range within the measurement capability of the force-measuring device.

3. The force-measuring device of claim 1, further comprising:
   a device that measures the currents supplied by the partial current sources so that, dependent on the measured values, the currents flowing through the windings can be controlled and/or regulated.

4. The force-measuring device of claim 1, further comprising:
   a power estimator, that determines the momentary power of the coil required to generate the compensation force, and, based on the momentary power estimate, controls and/or regulates the power to the given predetermined value.

5. The force-measuring device of claim 4, wherein:
   the power estimator calculates the momentary power (P0) of the coil based on the sum of the currents I1 and I2, by means of the equation $P0 = R \times (I1 + I2)^2$, where R represents the total resistance of the coil and I1, I2 represent the partial currents flowing to the respective windings.

6. The force-measuring device of claim 1, further comprising:
   a control quantity generator that calculates a control quantity which is used for the control and/or regulation of the partial current sources and which depends on an amount of power that is required at any point in time to generate the compensation force.

7. The force-measuring device of claim 6, further comprising:
   a power distributor that controls and/or regulates the partial current sources in accordance with the control quantity.

8. The force-measuring device of claim 7, wherein:
   the control quantity generator is configured to calculate the control quantity (x) according to the equation:

$x = a - b\sqrt{P^*} + c\sqrt{(P^*-1)}$, where a, b and c are constants and P* is a normalized value of the momentary power P0 of the coil which is needed to generate the required compensation force at any point in time, calculated according to the equation $$P^* = \frac{Ptot}{P0}$$

where Ptot is the total power of the coil at full load.

9. The force-measuring device of claim 1, wherein:
   each partial current source is connected directly to the assigned winding to supply the current.

10. The force-measuring device of claim 1, wherein:
    each partial current source delivers direct current to the assigned winding in accordance with a predetermined given offset voltage.

11. The force-measuring device of claim 1, wherein:
the device that controls and/or regulates comprises at least two switching elements that break the partial currents up into a substantially pulse-shaped form, wherein, in the time profile of the partial currents, a time interval can be prescribed during which the partial currents are flowing simultaneously.

12. The force-measuring device of claim 11, wherein:
the device that controls and/or regulates comprises at least one delay element, connected to a corresponding switching element to control the switching element by means of a control signal that depends on a delay value that corresponds to the time interval.

13. The force-measuring device of claim 12, wherein:
the device that controls and/or regulates comprises an arithmetic unit, connected to each of the respective delay elements, the arithmetic unit serving to calculate the delay value, dependent upon the applied force, and to transmit the calculated delay value to the respective delay element.

14. The force-measuring device of claim 13, further comprising:
a measuring unit that transmits a measurement signal that depends on the applied force to the arithmetic unit, for the calculation of the load-dependent delay value therein.

15. The force-measuring device of claim 5, wherein:
the device that controls and/or regulates comprises at least two switching elements that break the partial currents up into a substantially pulse-shaped form, wherein, in the time profile of the partial currents, a time interval can be prescribed during which the partial currents are flowing simultaneously.

16. The force-measuring device of claim 8, wherein:
the device that controls and/or regulates comprises at least two switching elements that break the partial currents up into a substantially pulse-shaped form, wherein, in the time profile of the partial currents, a time interval can be prescribed during which the partial currents are flowing simultaneously.

17. The force-measuring device of claim 5, wherein:
each partial current source delivers direct current to the assigned winding in accordance with a predetermined given offset voltage.

18. The force-measuring device of claim 8, wherein:
each partial current source delivers direct current to the assigned winding in accordance with a predetermined given offset voltage.

19. A balance, based on the principle of electromagnetic force-compensation, comprising:
a weighing pan on which a force acts;
a magnet system; and
an electric coil, arranged to be movable in the magnet system, the coil having at least two windings, a current supply device which has at least two partial current sources, each of the windings having one of the partial current sources assigned to it; and
a device that controls and/or regulates the current that the partial current sources supply to the windings so that, depending upon a magnitude of the force acting on the weighing pan, the currents supplied are sent in such a way that:
the two electromagnetic forces generated thereby are summed to form a compensation force; and that
at the same time, the coil dissipates the power at a constant predetermined value.

20. A device for measuring a force which is based on the principle of electromagnetic force-compensation, comprising:
a magnet system; and
an electric coil, arranged to be movable in the magnet system, the coil having at least two windings, a current supply device which has at least two partial current sources, each of the windings having one of the partial current sources assigned to it; and
a device that controls and/or regulates the current that the partial current sources supply to the windings using a control quantity generator that calculates a control quantity which depends on an amount of power that is required at any point in time to generate the compensation force so that, depending upon a magnitude of the force acting on the force-measuring device, the currents supplied are sent in such a way that:
the two electromagnetic forces generated thereby are summed to form a compensation force; and that
at the same time, the coil dissipates the power at a given predetermined value.

21. A device for measuring a force which is based on the principle of electromagnetic force-compensation, comprising:
a magnet system; and
an electric coil, arranged to be movable in the magnet system, the coil having at least two windings, a current supply device which has at least two partial current sources, each of the windings having one of the partial current sources assigned to it;
and a device that controls and/or regulates the current that the partial current sources supply to the windings, the device comprising at least two switching elements that break the partial currents up into a substantially pulse-shaped form, so that, in the time profile of the partial currents, a time interval can be prescribed during which the partial currents are flowing simultaneously, and so that, depending upon a magnitude of the force acting on the force-measuring device, the currents supplied are sent in such a way that:
the two electromagnetic forces generated thereby are summed to form a compensation force; and that
at the same time, the coil dissipates the power at a given predetermined value.

* * * * *